US006546350B1

(12) United States Patent
Hartmann et al.

(10) Patent No.: US 6,546,350 B1
(45) Date of Patent: Apr. 8, 2003

(54) CONFIGURATION AND PARAMETERIZATION SYSTEM FOR DIAGNOSTIC DEVICES AND ASSOCIATED METHOD

(75) Inventors: Doris Hartmann, Gundelsheim (DE); Sofiane Kacem, Nuremberg (DE); Karl-Heinz Maier, Nuremberg (DE); Klaus-Dieter Mueller, Nuremberg (DE); Nicolai Plewinski, Roethenbach/Pegnitz (DE); Thomas Voelkel, Bad Steben (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/688,802

(22) Filed: Oct. 17, 2000

Related U.S. Application Data

(63) Continuation of application No. PCT/DE99/01112, filed on Apr. 14, 1999.

(30) Foreign Application Priority Data

Apr. 17, 1998 (DE) ........................................ 198 16 884
Oct. 30, 1998 (DE) ........................................ 198 50 122

(51) Int. Cl.[7] ................................................ G06F 19/00

(52) U.S. Cl. ....................... 702/119; 706/911; 706/912; 706/914; 706/919

(58) Field of Search ........................... 702/56, 119, 120, 702/123; 706/45, 47, 50, 60, 919, 916, 911, 912, 914

(56) References Cited

U.S. PATENT DOCUMENTS 4,794,559 A 12/1988 Purcell et al.
4,835,459 A 5/1989 Hamlin et al.
4,980,844 A 12/1990 Demjanenko et al.
5,107,428 A 4/1992 Bethencourt et al.
5,293,585 A * 3/1994 Morita ........................ 706/45
5,327,553 A 7/1994 Jewett et al.
5,388,188 A * 2/1995 Selfridge et al. ............. 706/45
5,481,481 A 1/1996 Frey et al.
5,497,335 A * 3/1996 Hoeller ....................... 364/470
5,548,714 A * 8/1996 Becker ........................ 706/11
5,555,406 A * 9/1996 Nozawa ...................... 395/500
5,661,668 A 8/1997 Yemini et al.
5,878,746 A * 3/1999 Lemelson et al. ....... 128/653.1
5,963,884 A * 10/1999 Billington et al. ............ 702/56
5,991,707 A * 11/1999 Searles et al. .............. 702/185
6,049,764 A * 4/2000 Stahl .......................... 702/183
6,192,325 B1 * 2/2001 Piety et al. ................. 702/184
6,200,025 B1 * 3/2001 Rich .......................... 378/207

FOREIGN PATENT DOCUMENTS

EP 0599113 A1 6/1994
JP 61262862 A 11/1986
JP 04108438 A 4/1992
JP 07077519 A 3/1995
WO WO 98/01728 1/1998

* cited by examiner

*Primary Examiner*—Patrick Assouad
(74) *Attorney, Agent, or Firm*—Sughrue Mion, PLLC

(57) ABSTRACT

The invention is directed to a system and a method for the configuration and/or parameterization of diagnostic devices for test objects. The system includes a first data object having a collection of technological test object parameters of the test object and its components, and a second data object having a collection of technological parameters of hardware components of the diagnostic device. The system further includes a first program object containing data sentences for the assignment of at least test object parameters and technological parameters of hardware components, and a second program object for processing the data sentences assigned in the first program object. Via the data and program objects, a knowledge base is created that results in a configuration mainly automatically controlled by the knowledge of the system and/or parameterization of the diagnostic device including the test structure and evaluation. In this manner, the cost of such preparations is significantly reduced.

16 Claims, 3 Drawing Sheets

CONFIGURATION AND PARAMETERIZATION SYSTEM FOR DIAGNOSTIC DEVICES AND ASSOCIATED METHOD

This is a Continuation of International Application PCT/DE99/01112, with an international filing date of Apr. 14, 1999, the disclosure of which is incorporated into this application by reference.

FIELD OF AND BACKGROUND OF THE INVENTION

The invention is directed to a system and an associated method for configuration and/or parameterization of a diagnostic device for test objects.

This type of system and/or method is used, for example, in the field of signal detection and signal evaluation. Measurement hardware and signal processing software is often combined for these purposes, and due to the complexity of the interrelationships of this type of measurement assembly, the knowledge and experience of specialists is often required. However, the objects to be examined using the diagnostic device could be of a technical or non-technical nature. One example of a technical object is an electric motor that is to be examined for bearing damage using the diagnostic device through, for example, an acoustic examination. One example of a non-technical object is a person whose physical condition is to be examined using a medical diagnostic device, for blood pressure measurement, EKG, etc.

WO 98/01728 discloses a device for detection of analog measurement signals for the acoustic diagnosis of test specimens. Analog measurement signals can hereby be detected from a test specimen using vibration detectors.

A computer is equipped with a standard interface card that digitalizes the measurement signals. A switch signal produces a trigger signal which can be input via a preferably serial interface. A control program in the computer switches the input of measurement signals on and off via the trigger signal.

OBJECTS OF THE INVENTION

According to one object of the invention, it is sought to provide a system and a method for configuration and/or parameterization of a diagnostic device for objects, which system and method are operable in a uniform and readily apparent and understandable manner.

SUMMARY OF THE INVENTION

The invention achieves this and other objectives by providing a system for configuration and parameterization of a diagnostic device for test objects. The system includes a first data object, which contains a collection of technological test object parameters of the object and its components, and a second data object, which contains a collection of technological parameters of hardware components that are used in the construction of the diagnostic device. The system further includes a first program object, which contains data sets for, at least, the assignment of test object parameters and technological parameters of hardware components, and a second program object for processing the data sets assigned in the first program object.

The invention further achieves this and other objectives by providing a method for configuration and/or parameterization of a diagnostic device for test objects, in which a collection of technological test object parameters of the object and its components is produced in a first data object. The method further includes producing a collection of technological parameters of hardware components during the construction of the diagnostic device, which collection is contained in a second data object. The method also determines data sets for assignment of, at least, test object parameters and technological parameters of hardware components in a first program object. Data sets for the configuration and/or parameterization of the diagnostic device assigned in the first program object are processed further in a second program object.

The invention is based, in part, on the finding that the knowledge and know-how necessary to configure and/or parameterize a diagnostic device can be systematically acquired and saved, with the goal of performing the configuration and parameterization automatically, or at least computer-assisted, as much as possible. The benefits are twofold. First, this provides an added margin of safety for the configuration and/or parameterization of the diagnostic device. Second, specially trained employees can be largely dispensed with for the configuration and parameterization, as the necessary knowledge is already present in the system.

This knowledge includes two categories. First, this knowledge includes the test object parameters of the first data object. These test object parameters contain technological parameters of the test object. For example, in the case of testing a motor, the technological parameters may comprise information regarding the number of bearings. Second, this knowledge includes the collection of the technological parameters of the hardware components necessary for the diagnostic device, such as, for example, sensors for an acoustic examination of a motor.

Furthermore, the system contains an interconnection in the form of the first program object, i.e. an assignment of the test object parameters of the test object, e.g. a motor, to the technological parameters of the hardware components, e.g. a sensor. Thus, for this example, the first program object would specify where the sensor should be positioned on the motor.

The second program object processes the data sets contained in the first program object. The second program object also signals in the case described, for example, what sensitivity the sensor should be adjusted to and/or which further hardware components are necessary for the diagnostic device, i.e. for the testing assembly.

As a result, a virtual configuration and/or parameterization which is automatically controlled to the extent possible by the knowledge of the system thus provides an image of the real diagnostic device, including test assembly and evaluation, thereby significantly reducing the cost for this type of construction.

A uniform and integral system for configuration and/or parameterization can be attained if the hardware and/or software objects usable in the construction of the diagnostic device can be imaged by software elements.

One particularly effective and interesting application of the present invention is used with a technical test object, and more particularly with a motor. In this exemplary application, the diagnostic device is used for the assignment of vibro-acoustic measurement values of the object to quality and defect classes. As a further application, a diagnostic device is also used with a non-technical test object, and more particularly with a person. In this second exemplary application, the diagnostic device is used for assignment of measurement values indicative of the health of the person to health classes.

A uniform user interface for all steps of the process can be attained if the system has a design interface and a program section that serves as assistant, parameterizer, and/or configurator for processing the requests obtained via the design interface and which provides, based on a knowledge base, a result on the design interface assigned to one of the current requests.

The program section can be advantageously configured in such a way that the program section for processing of calls is provided such that currently needed data, in the form of rules and data, is requested from the so-called knowledge base. The knowledge base hereby includes further data from object descriptions which contain the technological characteristics of the individual objects of the diagnostic device.

Advantageous applications of the invention can be achieved by providing a system and a method for automatic configuration and parameterization of the diagnostic device for selection and performance of a testing procedure and for evaluation of the test results.

A further advantageous embodiment of the invention can be attained by providing a system having a further data object that contains a collection of sample signal traces, whereby the sample signal traces are assigned to quality and/or defect classes.

BRIEF DESCRIPTION OF THE DRAWINGS

The invention and advantageous refinements thereof are explained in more detail below with reference to the exemplary embodiments depicted in the figures.

DETAILED DESCRIPTION OF THE PREFERRED EMBODIMENTS

Figure 1:
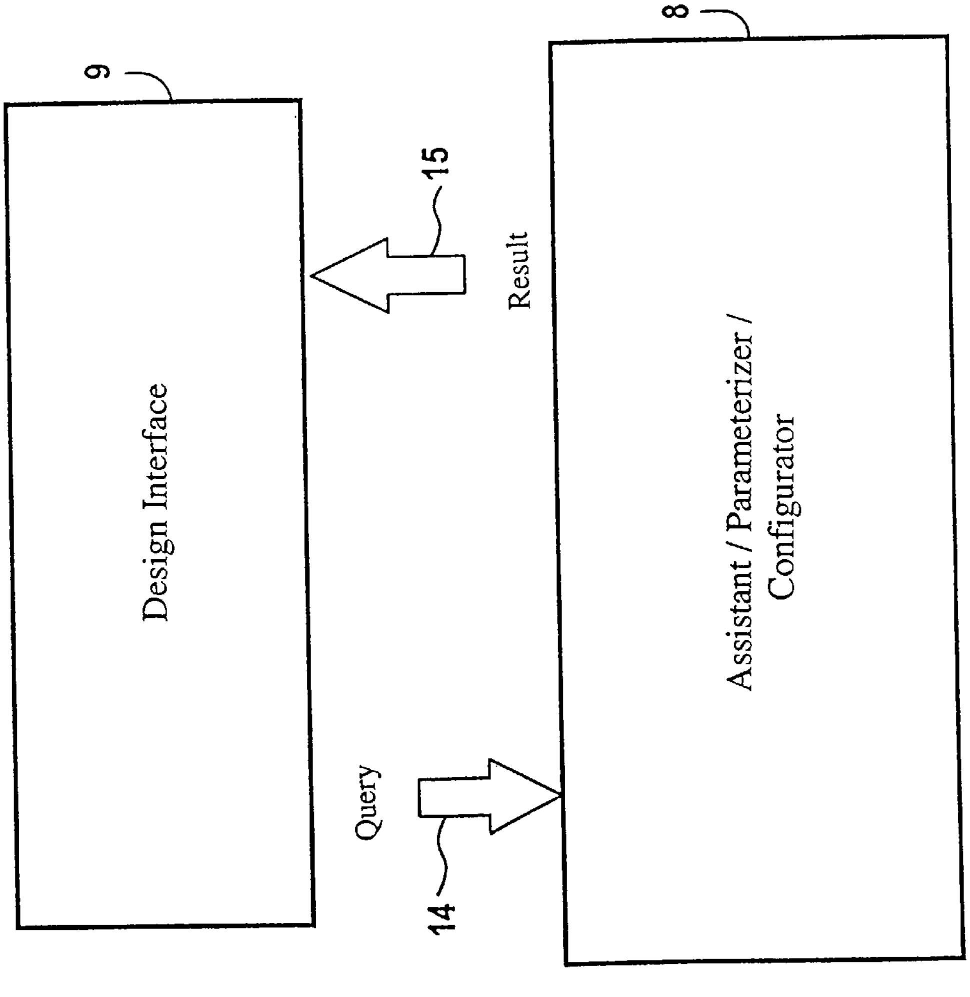
FIG. 1 shows a block diagram of basic elements of a system for configuration and/or parametrization of a diagnostic device for test objects and the data exchange between these elements.

FIG. 1 shows a block diagram of basic elements 8, 9 of a system for configuration and/or parameterization of a diagnostic device for test objects and the data exchange 14, 15 between these elements in the form of request 14 and result 15. The basic elements 8, 9 contained in FIG. 1 comprise a design interface 9 and a program section 8, which is also referred to as assistant, parameterizer, or configurator hereafter. The design interface 9 is, for example, realized using of a personal computer with a display screen, keyboard, and mouse.

The program section 8, referred to as an assistant/parameterizer/configurator, or more briefly as assistant 8, can be called up via the design interface 9, depending on the current design step to be carried out. The assistant 8 conditions the call up by requesting the data currently needed, e.g. in the form of rules and data, from the so-called knowledge base. As will be described in more detail in relation to the FIGS. 2 and 3, the knowledge base itself includes further data from data sets that are referred to as object descriptions and that contain technological characteristics of the individual objects in the test system. The test specimen, hardware components of the section measured, analysis processes used, etc. could hereby be viewed as objects.

Using the assistant 8, an automatic configuration and/or parameterization of a diagnostic device can be effected by means of the system depicted in FIG. 1, e.g. with, for example, the following steps:

- selecting the hardware components necessary and/or suitable to perform the current test task,
- configuring, i.e. connecting the selected hardware components,
- parameterizing the selected hardware components, e.g. setting the sampling rates of transducers,
- configuring the test sequence, i.e. connecting the software components involved, e.g. those for measurement value detection, measurement value filtering, measurement value transformation, etc.,
- selecting an analysis process for the measurement values detected and parameterizing the same,
- interpreting the analysis results,
- determining characteristics, and
- defining thresholds.

An executable test program can be produced through the design interface 9 or through the assistant 8 itself.

Figure 2:
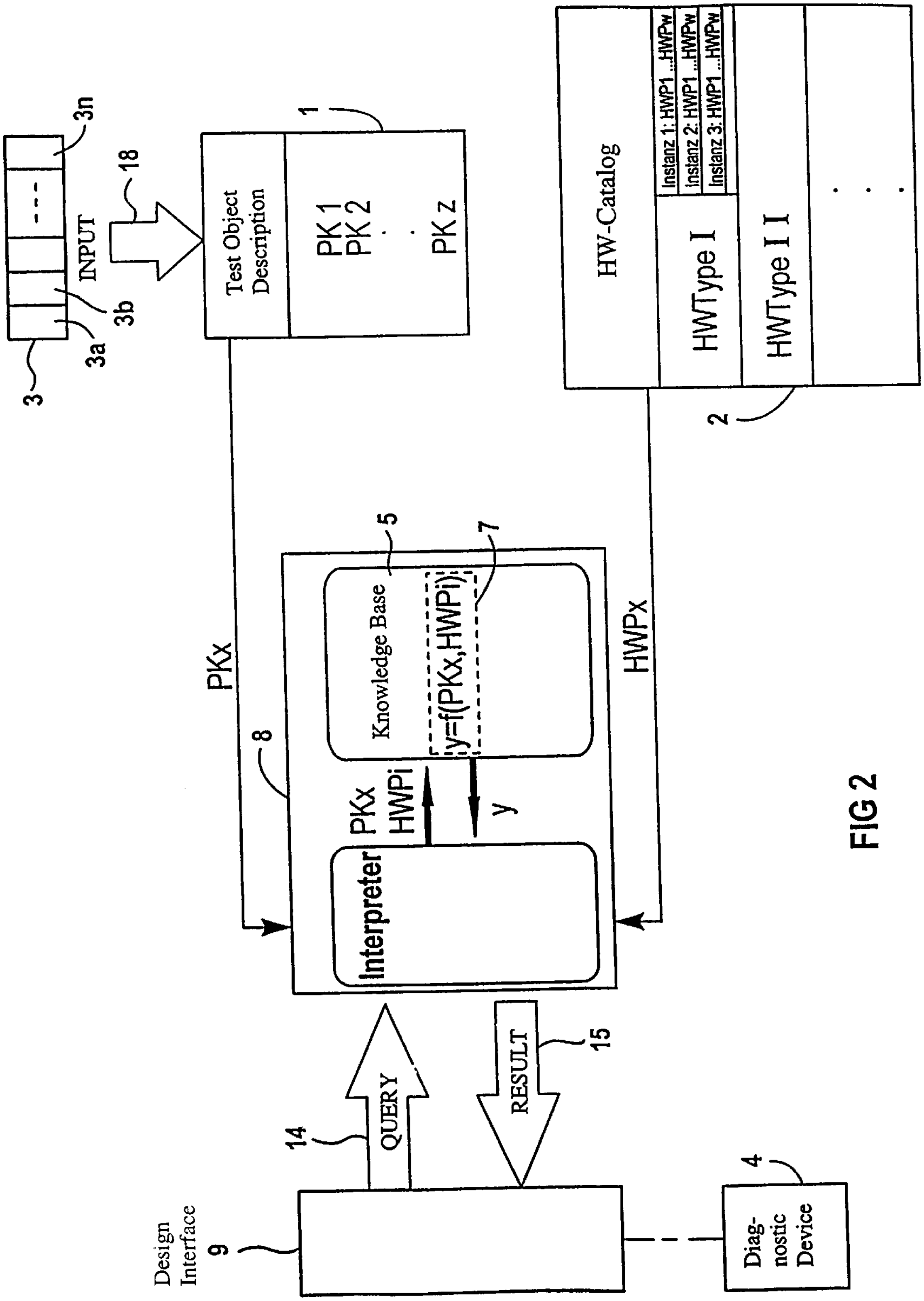
FIG. 2 shows a schematic diagram of a first exemplary embodiment of a system for selection, configuration, and parameterization of a diagnostic device for test objects.

FIG. 2 shows a system 8, 9 for automatic configuration and parameterization of a diagnostic device 4 for a test object 3 (test specimen) with sub-components 3*a* . . . 3*n*. System 8 contains a first data object 1, which represents a test object description. The first data object 1 contains a collection of test object parameters PK1, PK2 . . . PKz, which contain technological parameters of the test specimen 3 and its components 3*a* . . . 3*n*. Furthermore, a second data object 2 is provided which represents the so-called hardware catalog. The second data object 2 contains a collection of virtual hardware components HWType I, HWType II, etc., as an image of real hardware components and their technological parameters which could be used in the construction of a test assembly. The system 8, 9 for configuration of the diagnostic device 4 additionally has a first program object 5 (knowledge base) which contains data sets 7 for assignment of the test object parameters PK1, PK2, . . . PKz and the technological parameters HWType I, HWType II, . . . of hardware components. Furthermore, a second program object 6 (interpreter) is provided for processing the data sets 7 assigned in the first program object 5. A design interface 9 serves as a user interface, via which the calls 14 are made and the results 15 are received.

A call component is available through the design interface 9 to the user of the system 8, 9, with the aid of which a diagnostic device 4, such as a measurement or test assembly, can be configured. A request and/or a call 14 entered thereby branches into the program and data components 8, which are also indicated in FIG. 1 by assistant/parameterizer/configurator. The so-called interpreter 6, which calls the knowledge base 5, is contained as a program component in the assistant 8. The rules saved in the assistant 8 are processed in accordance with the type of the request 14. Various data are necessary for conditioning the rules, e.g. information on the current test object 3. Suitable sensors, for example, are selected depending on the type and condition of the test object. The test object can be, for example, a technical test object such as a motor, or a non-technical test object such as a person. In the latter case, the diagnostic device is used for assigning measurement values indicative of the health of the person to health classes. The various data are read by the assistant 8 from the corresponding object descriptions 1, 2, 5. The result of the conditioning of the rules can then, for example, be returned for display on the design interface 9.

All hardware and software objects of a complete test assembly 4 are imaged through software elements. A so-called sequencer results when these elements are interconnected by means of software and computerization. A software element representing the current test specimen 3 is always at the beginning of a sequencer. A software element representing a sensor is connected to this element. A software element representing signal matching is then connected to this element in turn, etc. At the end of the sequencer, there is a software element which represents an analysis process. Finally, downstream from this element, there is a software element which represents a so-called classificator.

The design interface 9 transmits the sequencer and the current call type to the assistant 8.

The assistant 8 inserts the next link in the chain of the sequencer based on rules from the knowledge base 5 and information which it reads in part from the already existing elements of the sequencer or it parameterizes still "empty" elements of the sequencer. It sends this modified sequencer back to the design interface 9. This interface can call the assistant 8 again in the next step until a complete test chain has been designed.

The assistant 8 essentially comprises two parts. The first part is referred to as a knowledge base 1, 2, 5 and comprises a storage area in which the knowledge affecting the current test assembly is stored, in regard to, for example, a vibro-acoustic test in the form of so-called rules and facts. The second part 6 is referred to as an interpreter 6 and comprises a program region which processes these rules and facts.

Figure 3:
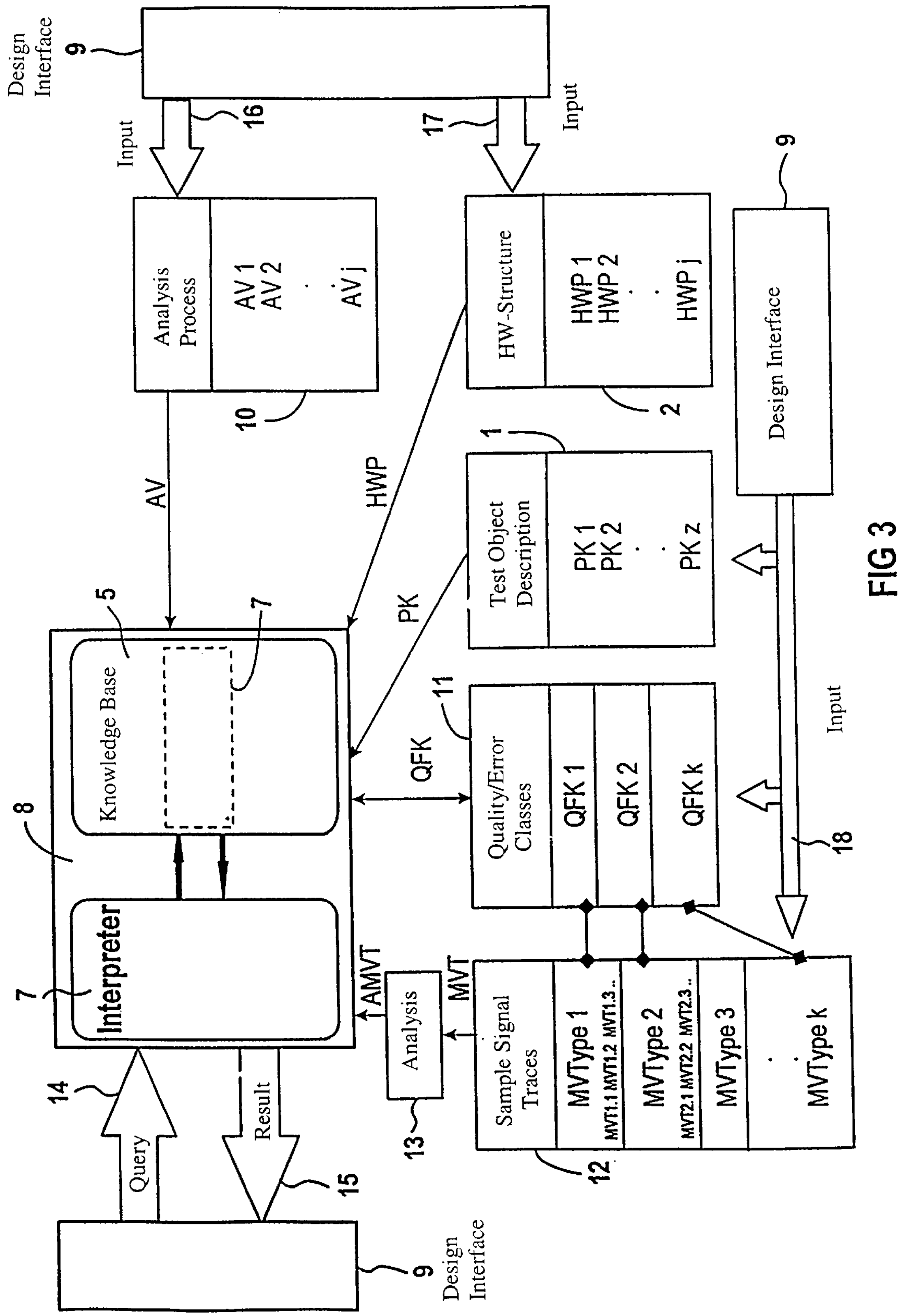
FIG. 3 shows a second exemplary embodiment of a system for configuration and parameterization of the testing sequence.

FIG. 3 shows a second exemplary embodiment of a system for configuration and parameterization of the test sequence. The reference numbers used in FIG. 3 have already been essentially noted in relation to FIGS. 1 and 2. Thus, the system depicted in FIG. 3 comprises data objects 1, 2, 10, 11, 12. As already described in connection with FIG. 2, the first data object 1 comprises a collection of test object parameters PK1, PK2 . . . PKz, which contain technological parameters of the test specimen and its components. In addition, a second data object 2 is provided which represents the so-called hardware catalog. The second data object 2 contains a collection of hardware components HWType I, HWType II, etc. and their technological parameters which could be used in the construction of a test assembly. In addition, the system comprises a third data object 10. The third data object 10 contains a collection of analysis processes, i.e. a collection of software components AV1, AV2 . . . AVj, which can be used to transform and evaluate the measurement data obtained. Fourier transforms, filters, statistical characteristics, etc. are examples of software components of this type.

The system further comprises a fourth data object 11 having a collection of data sets for quality/defect classes. The fourth data object 11 is used for automatic assignment of results obtained by means of an analysis process through transformation and evaluation of measurement values to predefined quality/defect classes QFK1, QFK2 . . . QFKk. Definite, and in particular, characteristically distinctive measurement values, of predetermined test object conditions, e.g. material, bearing damage, strip noise, etc., can hereby be assigned for quality evaluation of a test object. In particular, vibro-acoustic type measurement values can be assigned for quality valuation of a test object.

In addition, a fifth data object 12 is provided, which contains a collection of data sets for sample signal traces. These stored sample signal traces can be assigned for the evaluation of test results in, generally, a known condition of the test object. In the example of FIG. 3, test signal traces selected in this way are assigned to the corresponding data sets QFK1, QFK2, QFKk from the data object "quality/defect classes" QFK. Furthermore, a third program object 13 is provided which analyzes one or more sample signal traces MVT using an analysis process AV. The result AMVT of this type of evaluation is loaded into the interpreter 7 contained in the assistant. These results could be used in the interpreter 7 in order to perform, for example, an automatic assignment to a quality/defect class in a current test object.

The system 8, 9 for configuration of the diagnostic device 4 also includes a first program object 5 (knowledge base) that contains data sets 7 for assignment of the test object parameters PK1, PK2 . . . PKz and the technological parameters HWType I, HWType II . . . of hardware components. In addition, a second program object 6 (interpreter) is provided for processing the data sets 7 assigned in the first program object 5. A design interface 9 is used as a user interface, via which the calls/requests 14, results 15, and inputs 16, 17, 18 can be performed.

The assistant 8 for designing a test program, especially for acoustic diagnosis of a test specimen, will be briefly described as follows. The term "assistant" refers to a computer-assisted operable technical input aid, particularly a program consisting of several display screen operation masks. This can access stored data sets with technical characteristics of test objects, as well as at least one regulator, i.e. a so-called knowledge base 5. This type of assistant can also be referred to as a so-called "parameterizer."

The assistant is involved in automatically generating a so-called measuring chain and a test program by evaluating object descriptions. In this context, a measuring chain is an interconnection of measuring elements which must be interconnected to record, for instance, vibro-acoustic measuring values of a test object. A measuring chain comprises at least the actual sensors which are used e.g. for the absorption of impact noise. However, it can also contain elements that are used for signal adjustment and recording signals.

A test program includes algorithms for digitally processing data and for processing measuring values. Such algorithms are adjusted to the individual test to be performed. This is, for instance, how vibro-acoustic measuring values are recorded and processed using frequency analytical algorithms e.g. in the acoustic diagnosis.

The term "object descriptions" represents a generic term for the technical identification data of individual elements. In this context, all system elements can generally be characterized via an "object description." For instance, the individual test object, e.g. an electric motor, the hardware components required to process the measuring values, and the program parts used to parameterize algorithms and to process measuring values can be clearly determined as technical data, using "object descriptions."

For example, an object description of an electric motor being tested, can include, for instance, the number of bearings, their structure, the number of rotor slots and stator slots, and the rotational speed of the motor as identification values. As a second example, an object description of a sensor coupled to the test object, can also include, e.g. the input value range, the sensitivity and the weight as identification values. Finally, an object description of an algorithm used to process the measuring values and based on the Fourier transform, can contain for instance the window length, the type of weighing function and the degree of overlapping as identification values.

The invention will be explained in more detail with the use of two examples.

The first example is directed to the selection and design of sensors. The starting point for designing measuring equipment is the test object. The following will be described with reference to an exemplary test object comprising an electric motor with two bearings. The technical identification values describing the electric motor are stored in a software element. This software element is denoted in FIGS. 2 and 3 by the term "Test object description." The design interface sends this element to the assistant with the command "Give sensors." The assistant can conclude from the test element that it is an electric motor with two bearings (PK) and that the following measuring points are designed: housing radial, bearing 1 radial and bearing 2 axial. Based on the description and stored knowledge it generates parameters for sensor selection, reads suitable sensors from the hardware catalog (HWP), adds the software sensor elements to the process control, and fills them with concrete sensor data. Then it sends the modified process control back to the projection surface. The design interface next calls the assistant again, however, this time using the command "Give signal adjustment for sensors."

The second example is directed to the selection and the design of an analysis process and its parameters. If a quality error class QFK k has been designed, for instance the quality error class "streaking noise", at least one suitable analysis process must be found which allows its processing and evaluation. For this purpose, the design interface calls the assistant with the command "Give analysis process and its parameters" and the process control. Based on rules, the knowledge base activates a suitable analysis process AV j to the actually projected quality error class QFK k. For example, the quality error class "Cepstrum" can be activated. The parameters required for the calculation of a Cepstrum are generated by the knowledge base from the object descriptions in the software elements of the process control. Here, they are for instance the speed of rotation PKz of the motor (read from the component "test object description"), the scanning rate HWP j of the D/A converter (read from the component "HW structure") and the input time HWP 1 (also read from the component "HW structure"). From this, the one parameter required for the calculation of the Cepstrum is derived for the "overlapping." If analysis processes and their parameters have been determined, the required software elements are generated, parameterized and added to the process control. They are sent back to the design interface.

In summary, the invention is directed to a system (8, 9) as well as a method for the configuration and/or parameterization of a diagnostic device (4) for test objects (3). The system comprises a first data object (1) having a collection of technological test object parameters (PK1, PK2 . . . PKz) of the test object (3) and its components (3*a* . . . 3*n*), a second data object (2) having a collection of technological parameters (HWType I, HWType II, . . . ) of hardware components of the diagnostic device (4), a first program object (5) having data sequences (7) to assign at least test object parameters (PK1, PK2 . . . PKz) and technological parameters (HWType I, HWType II, . . . ) of hardware components, and a second program object (6) for processing the data sentences (7) assigned in the first program object (5). Via the data and program objects, a knowledge base is created which results in a configuration mainly automatically controlled by the knowledge of the system and/or parameterization of the diagnostic device including the test structure and evaluation. Accordingly, the cost of such preparations is significantly reduced.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A computer program product embodied on a computer-readable medium, which contains computer-executable instructions, the computer program product comprising:

a first data object comprising a plurality of technological test object parameters of a test object and of components of the test object;

a second data object comprising a plurality of technological parameters of hardware components that are utilized in design of a diagnostic device;

a first program object comprising data sequences assigning, at least, the technological test object parameters and the technological parameters of the hardware components; and a second program object processing the data sequences assigned in the first program object.

2. The computer program product according to claim 1, further comprising:

software elements representing all hardware and software objects that are utilized in design of the diagnostic device.

3. The computer program product according to claim 1, further comprising:

a design interface;

a program section serving as assistant, parameterizer and configurator and processing queries via the design interface; and a knowledge base, wherein the program section supplies to the design interface a result assigned to a query using the knowledge base.

4. The computer program product according to claim 3, wherein:

the knowledge base contains rules and data, the program section calls up individually required data from the knowledge base, and the knowledge base receives additional data from the data objects.

5. The computer program product according to claim 3, wherein the program section selects and performs a test process and evaluates test results.

6. The computer program product according to claim 3, wherein the program section comprises a third data object containing a plurality of sample signal traces that are assigned at least one of quality and error classes.

7. The computer program product according to claim 1, further comprising:

a third data object comprising a plurality of data sets for quality and defect classes and assigning vibro-acoustic measuring values of a motor to the quality and defect classes, and wherein the plurality of technological test object parameters pertains to a motor and to components of the motor.

8. The computer program product according to claim 1, wherein the test object comprises a nontechnical object, and wherein the diagnostic device is structured to assign measuring values indicative of a person's health to health classes.

9. A method comprising the steps of:

collecting a plurality of technological test object parameters of a test object and components of the test object in a first data object;

preparing a plurality of technological parameters of hardware components in a second data object during design of a diagnostic device for the test object;

determining, in a first program object, data sequences for the assignment of, at least, the technological test object parameters and the technological parameters of hardware components; and processing, in a second program object, the data sequences assigned in the first program object, thereby configuring and parameterizing the diagnostic device.

10. A method according to claim 9, further comprising:

representing hardware and software objects utilized in design of the diagnostic device through software elements.

11. A method according to claim 9, wherein the plurality of technological test object parameters pertain to a motor and to components of the motor, the method further comprising:

assigning vibro-acoustic measuring values of the motor to quality and error classes.

12. A method according to claim 9, wherein the test object comprises a non-technical object, and wherein the diagnostic device assigns measuring values indicative of a person's health to health classes.

13. A method according to claim 9, further comprising:

processing queries via a design interface using a program section serving as assistant, parameterizer and configurator; and supplying to the design interface a result assigned to the query and based on a knowledge base using the program section.

14. A method according to claim 9, further comprising:

requesting individually required data comprising rules and data from a knowledge base; and receiving additional data from the data objects by the knowledge base.

15. A method according to claim 13, further comprising:

selecting a test process by the program section; and evaluating test results by the program section.

16. A method according to claim 9, further comprising:

collecting sample signal traces in a third data object; and assigning the sample signal traces quality/error classes.

* * * * *